(12) United States Patent
Owensby (10) Patent No.: US 7,699,207 B1
(45) Date of Patent: Apr. 20, 2010

(54) WELDING BACKUP SYSTEMS FOR HEAT-SINK OR PURGE PURPOSES

(76) Inventor: Howard S. Owensby, Rt. 1 Box 400, Fair Grove, MO (US) 65648

( * ) Notice: Subject to any disclaimer, the term of this patent is extended or adjusted under 35 U.S.C. 154(b) by 19 days.

(21) Appl. No.: 12/221,979

(22) Filed: Aug. 8, 2008

Related U.S. Application Data (60) Division of application No. 10/985,349, filed on Nov. 10, 2004, now Pat. No. 7,410,087, which is a continuation-in-part of application No. 10/871,554, filed on Jun. 17, 2004, now abandoned.

(60) Provisional application No. 60/479,549, filed on Jun. 18, 2003.

(51) Int. Cl.
*B23K 37/04* (2006.01)

(52) U.S. Cl. ..................... 228/44.5; 228/49.3

(58) Field of Classification Search ........................ None
See application file for complete search history.

(56) References Cited

U.S. PATENT DOCUMENTS

| | | | | |
|---|---|---|---|---|
| 478,024 | A | 6/1892 | Rose | 29/272 |
| 2,792,626 | A | 5/1957 | Chyle | 228/216 |
| 3,024,525 | A | 3/1962 | Wisberger | 228/157 |
| 3,225,953 | A | 12/1965 | Wolfe | 220/4.12 |
| 3,524,475 | A | 8/1970 | Kirk | 138/30 |
| 3,910,480 | A * | 10/1975 | Thatcher | 228/45 |
| 3,940,048 | A | 2/1976 | Casy | 228/50 |
| 3,972,466 | A | 8/1976 | Keith | 228/216 |
| 3,979,041 | A * | 9/1976 | Kaneyama et al. | 228/49.3 |
| 4,150,775 | A | 4/1979 | Roden et al. | 228/50 |
| 4,182,951 | A | 1/1980 | Kuder | 219/160 |
| 4,201,326 | A | 5/1980 | Connell | 228/50 |
| 4,205,219 | A | 5/1980 | Snell | 219/160 |
| 4,216,896 | A * | 8/1980 | Chang et al. | 228/212 |
| 4,285,458 | A * | 8/1981 | Slavens | 228/49.3 |
| 4,344,556 | A | 8/1982 | Knapp | 228/50 |
| 4,363,954 | A | 12/1982 | Rinaldi | 219/160 |
| 4,682,724 | A | 7/1987 | Hahn | 228/50 |
| 4,759,981 | A | 7/1988 | Weil | 428/343 |
| 5,110,031 | A | 5/1992 | Rinaldi | 228/50 |
| 5,123,571 | A | 6/1992 | Rebeyrolle et al. | 222/105 |
| 5,152,452 | A | 10/1992 | Fendel | 228/184 |

(Continued)

FOREIGN PATENT DOCUMENTS

JP  2002005399 A  1/2002

*Primary Examiner*—Kiley Stoner
(74) *Attorney, Agent, or Firm*—Jonathan A. Bay (57) ABSTRACT

An internal ring assembly for welding backup against internal hoops of pipes or tanks has a chain assembly of diverse cells. A majority of the cells include a tile of conductive metal for abutting inside walls across a seam of two sections of pipe or tank to be welded, as well as a cell of a roller chain assembly comprising either both a pin-link and roller-link construction or alternatively a pair of mosaic-link constructions. In either case, one of such link constructions is anchored to the tile and the other extends free of the tile for linking with another cell of the chain assembly. In contrast, a minority of the cells are arranged to produce an expansion force on the chain assembly as a whole in order that the chain assembly expansively forces itself tightly against the inside seam of the pipe or tank sections.

13 Claims, 12 Drawing Sheets

U.S. PATENT DOCUMENTS

| | | | | |
|---|---|---|---|---|
| 5,285,947 A * | 2/1994 | Depperman | ............... | 228/49.3 |
| 5,361,972 A | 11/1994 | Barker | ............... | 228/219 |
| 5,386,925 A | 2/1995 | Lane | ............... | 220/530 |
| 5,398,862 A | 3/1995 | Aleman | ............... | 228/49.3 |
| 5,425,492 A | 6/1995 | Thode | ............... | 228/102 |
| 5,435,479 A * | 7/1995 | Puzey et al. | ............... | 228/44.5 |
| 5,535,938 A * | 7/1996 | Leduc | ............... | 228/212 |
| 5,669,547 A | 9/1997 | Spring | ............... | 228/219 |
| 5,944,246 A | 8/1999 | Mergell | ............... | 228/6.1 |
| 5,981,897 A | 11/1999 | Offer et al. | ............... | 219/75 |
| 6,070,784 A | 6/2000 | Holt et al. | ............... | 228/112.1 |
| 6,119,916 A * | 9/2000 | Anderson et al. | ............... | 228/44.5 |
| 6,257,479 B1 * | 7/2001 | Litwinski et al. | ............... | 228/112.1 |
| 6,398,100 B1 * | 6/2002 | Radbourne et al. | ............... | 228/44.5 |
| 6,568,701 B1 | 5/2003 | Burdack et al. | ............... | 280/728.2 |
| 6,572,002 B2 * | 6/2003 | Faroldi | ............... | 228/8 |
| D478,024 S | 8/2003 | Nordstrom | ............... | D11/221 |
| 6,651,967 B1 * | 11/2003 | Barber | ............... | 269/43 |
| 2006/0118603 A1 | 6/2006 | Le Cocq et al. | ............... | 228/212 |
| 2007/0053238 A1 | 3/2007 | Kocienski | ............... | 366/273 |
| 2007/0256288 A1 * | 11/2007 | Vermaat | ............... | 29/464 |

* cited by examiner

WELDING BACKUP SYSTEMS FOR HEAT-SINK OR PURGE PURPOSES

CROSS-REFERENCE TO RELATED APPLICATION(S)

This application is a divisional of U.S. patent application Ser. No. 10/985,349, filed Nov. 10, 2004 now U.S. Pat. No. 7,410,087, which is a continuation-in-part of U.S. patent application Ser. No. 10/871,554, filed Jun. 17, 2004, abandoned, which claims the benefit of U.S. Provisional Application No. 60/479,549, filed Jun. 18, 2003, all of which disclosures are incorporated herein by this reference.

BACKGROUND AND SUMMARY OF THE INVENTION

The invention relates to welding backup systems for heat-sink or purge purposes as for application to welding construction of pipelines or tanks and the like.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
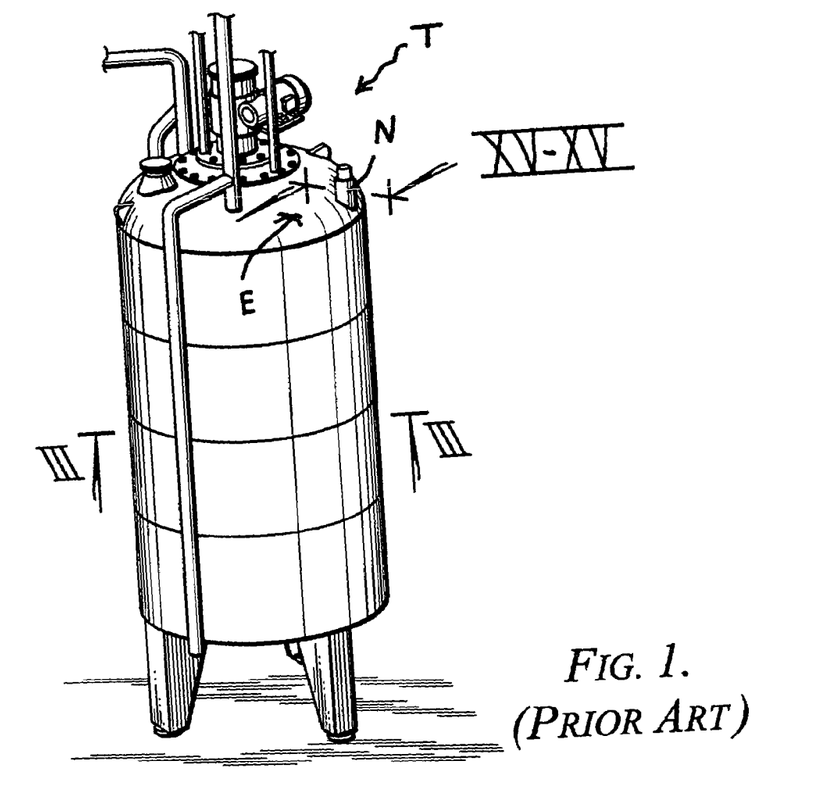
FIG. 1 is a perspective view of a tank in accordance with the prior art.

FIG. 1 shows a tank T in accordance with the prior art. Briefly, the tank T has a domed top-end or cap E outfitted with various access fixtures or nozzles N. This type of tank is conventional in process industries for the production of pharmaceutical products, whether that be end-products or, more typically, intermediate products. The prior art prefers such tanks to be welded up out of stainless steel components. The prior art also prefers stainless steel weldments to be backed up by heat sinks as well as purged of oxidizing gases to the extent practical. The longstanding problem has been, naturally, to what extent is practical under the circumstances.

Figure 2:
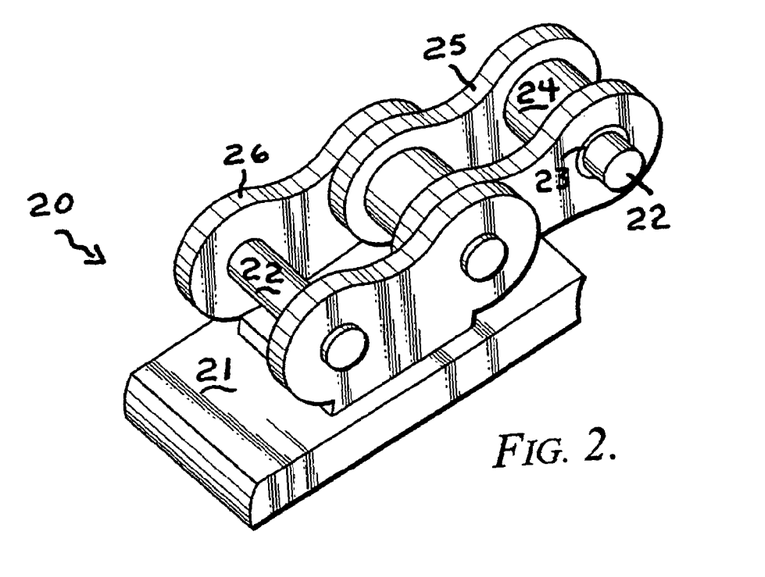
FIG. 2 is a perspective view of a given tile unit in accordance with the invention for chaining together indefinitely with other like tile units, a few dissimilar units aside, and producing an internal ring assembly in accordance with the invention for welding backup.
Figure 6:
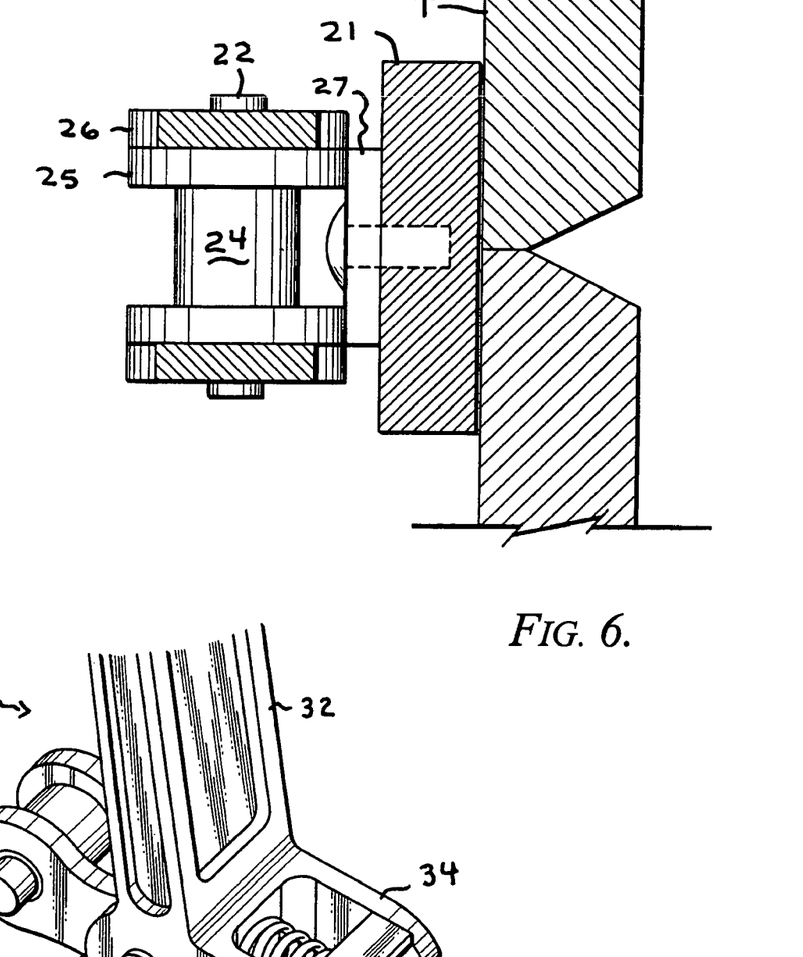
FIG. 6 is an enlarged scale section view taken along line IV-IV in FIG. 3.

FIG. 2 shows a given tile unit 20 in accordance with the invention for chaining together indefinitely with other like tile units, a few dissimilar units aside. As more particularly shown by FIG. 3, a chain of like tile units 20 allows production of an internal ring assembly 10 in accordance with the invention for welding backup. In FIG. 2, the given tile unit 20 comprises a tile 21 mated to a discrete cell of a roller chain, including pins 22, bushings 23, rollers 24, roller-link plates 25, and pin-link plates 26. FIG. 6 better shows that between either the roller-link plates 25 or the pin-link plates 26, preferably at least one of such plate pairs 25 or 26 are fixed to a mounting fixture (eg., base plate) 27 for fastening tight to the tile 21.

Figure 3:
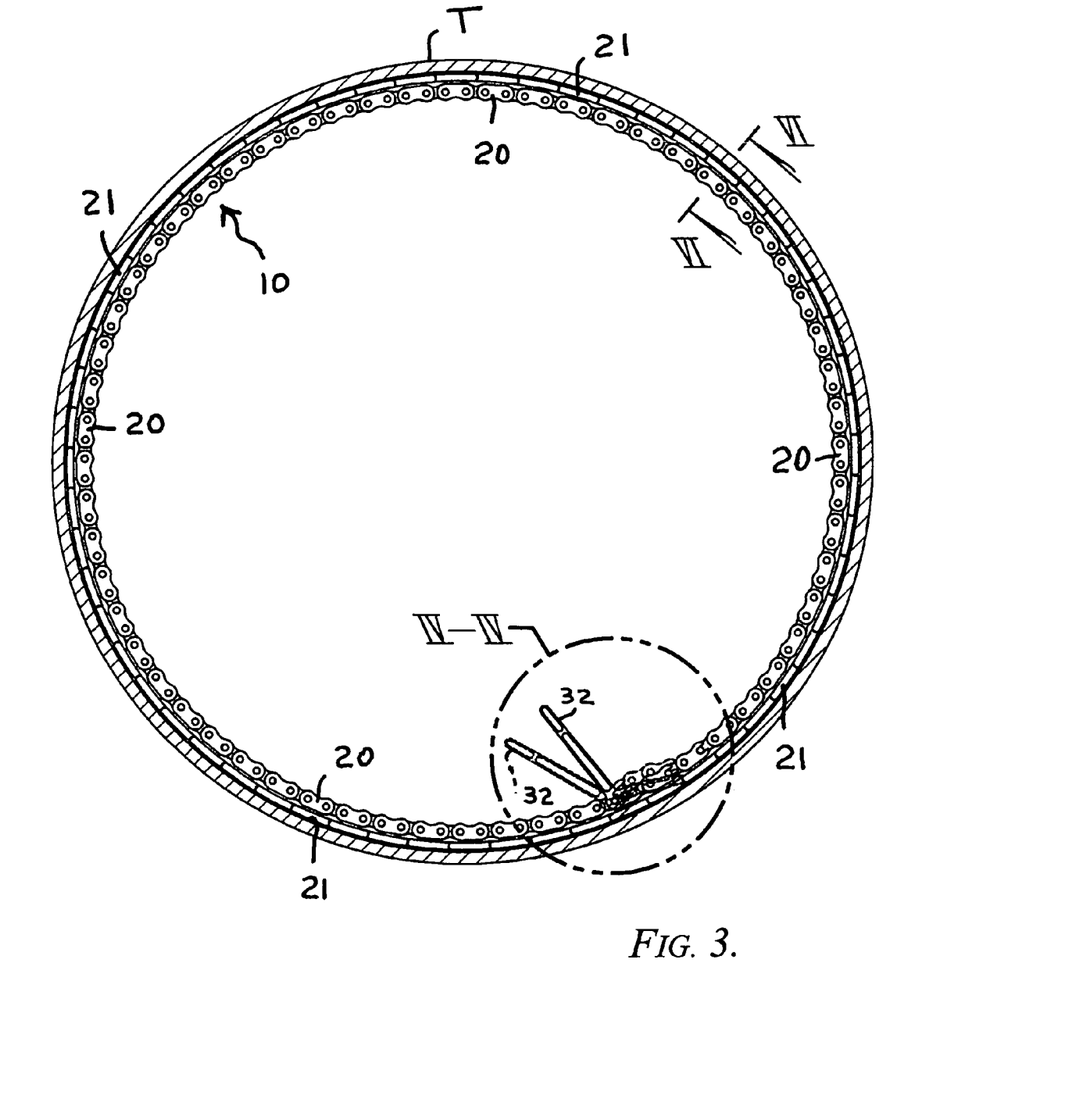
FIG. 3 is an enlarged scale section view taken along line in FIG. 1, showing an example operative use environment for such an internal ring assembly in accordance with the invention for welding backup, as for example and without limitation utilization in connection with butt welds of hoop sections.

FIG. 3 shows an example operative use environment for such the internal ring assembly 10 in accordance with the invention. For example and without limitation, the tank T might have a six foot (~1.8 m) outside diameter, and even if the top end cap E is welded in place, it will include a manhole for worker access in and out of the tank. In use, a worker constructs a chain assembly 10 of the target inside circumference for a match as close as possible. Then the worker temporarily hangs the chain assembly 10 on the inside wall of the tank T at a seam for butt welding. One way to do this is by progressively working around in a circle and taping the chain assembly 10 to the tank T's wall at angularly spaced locations by vertically-arranged strips of aluminum tape or the like. The aluminum tape just provides temporary holding power. Regardless if it takes one, two or more workers to hang the chain assembly 10, this step of the workflow is readily aided by the tape (whether it be simply duct tape) temporarily holding the chain assembly 10 at its elevation in the tank T on the seam.

Figure 4:
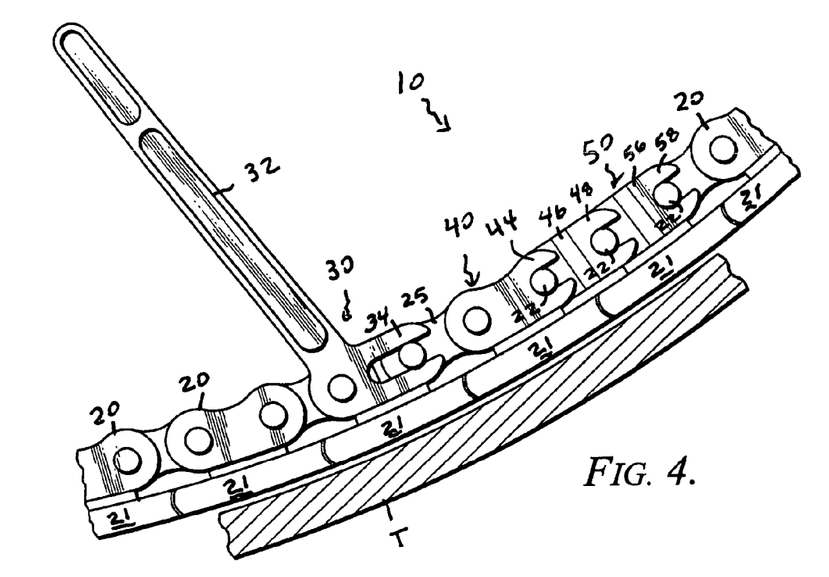
FIG. 4 is an enlarged scale view of DETAIL IV-IV in FIG. 3.
Figure 7:
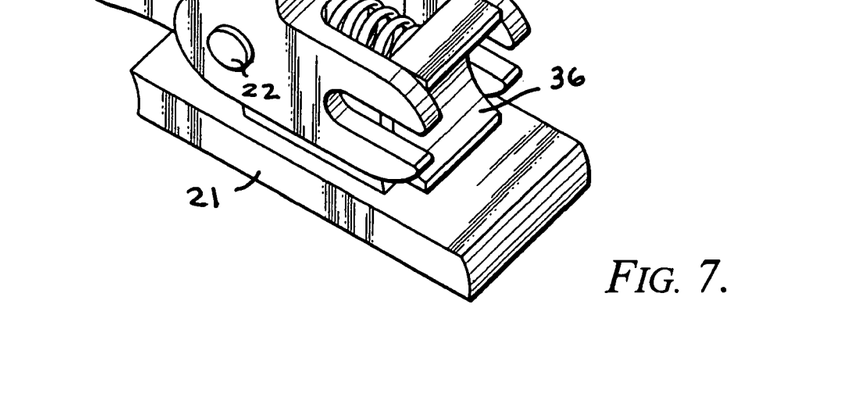
FIG. 7 is an enlarged scale perspective view, partly broken away, of the jamming or wedging tile unit in accordance with the invention and as previously shown in FIGS. 3 and 4.

FIG. 4 shows better what is encircled by detail IV-IV in FIG. 3. Plural (eg., three in this view) tile units (eg., 30, 40, 50) differ from the given tile units 20 as follows, wherein preferably the given tile units 20 proceed uninterrupted by any other dissimilar tile units until meeting at the opposite ends of the circle (or hoop of whatever geometry). The lever unit 30 has a handle-lever 32 for causing a jamming or wedging action among tile units 30, 40, 50 in order to apply an expansion force on the chain assembly 10 as a whole comprising substantially a chain of the given tile units 20. As shown better by FIG. 7, the lever tile unit 30 has its lever pivoting on chosen pin 22, the lever has a tool end forming dual forks 34 for engaging the pin ends of succeeding tile unit 40 as well as has a concave, spring-biased pressure applicator 36 for engaging the rounded lobes of the dual roller-link plates 25 of succeeding tile unit 40.

Returning to FIG. 4, tile unit 40 proceeds to terminate in dual forks 44 for engaging the pin ends 22 of mosaic link plates 46, which in turn proceed to terminate in forks 48 for engaging the pin ends 22 of the next successive tile plate 50, which has like mosaic link plates 56 having fork ends 58 for engaging the pin ends 22 of the first-in-line given tile unit 20. Mosaic link plates 46 and 56 are characterized as having roller-gripping origins and flaring out to (or otherwise changing into) pin-gripping terminations. As can be reckoned by FIGS. 3 and 4, operating the lever 32 counterclockwise causes the tiles of tile units 30, 40 and perhaps 50 to lift away from flush contact with the wall of the tank T, and thereby release or break the application of an expansion force. In FIG. 3, the lever 32 is depicted by solid lines to show the lock or jamming position, and is depicted in dashed lines to show the release or break position. In reverse, operation of the lever 32 to the jamming or wedging position shown by FIG. 4 achieves the requisite jamming or wedging force on the chain assembly 10 as a whole to expand it snugly in good thermal contact with the wall of the tank T.

Figure 5:
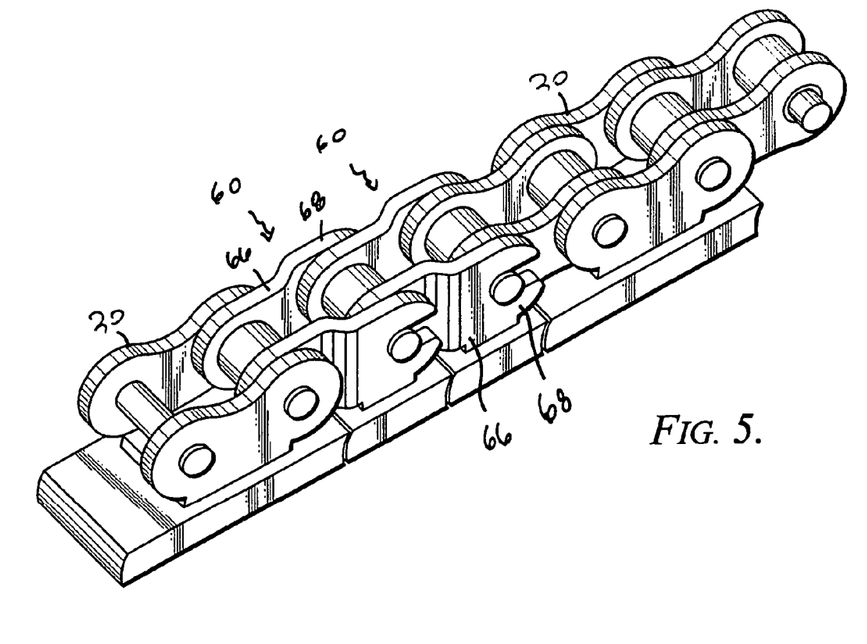
FIG. 5 is a perspective view comparable to FIG. 2 except showing not only given tile units as better shown by FIG. 2 but also at least one embodiment of dissimilar tile units in accordance with the invention.

FIG. 5 shows not only given tile units 20 as better shown by FIG. 2 but also at least one embodiment of dissimilar tile units 60 in accordance with the invention. These dissimilar tile units 60 have smaller tile-footprints than other tile units in order to allow assembly of a chain 10 made of fractionally smaller units. This provides modularity when it comes to building a chain 10 of a selected length. Adding or subtracting the small tiles 60 provides finer granularity in achieving the desired length nearly exactly. Put differently, this allows allow formation of a chain hoop 10 of fairly precise measure.

The chain hoop 10's final measure is not limited to integer multipliers of the standard tile footprint of tile units 20. These tile units 20 might measure four to six inches (~10 to 15 cm) in span. In contrast, the dissimilar tile units 60 are about half the size of the other tile units (eg., two to three inches, or ~5 to 7½ cm, in span). The dissimilar tile units 60 also feature mosaic-style link plates 66 having fork ends 68 as described more particularly above.

To return back briefly to FIG. 3, among other things, it shows the internal ring 10 expansively forced tight against the tank T's inside wall. Moreover, FIG. 3 shows that adjacent tiles 21 are scalloped alternately concave and convex to abut one another more compactly. This provides several advantages. The tiles 21 adapt better to use on tanks having a wide range of inside diameters. That way, an internal ring 10 can be formed of larger or smaller overall diameters with the tiles 21 still compactly mating each other because each relatively pivots at its edges relative its neighbors. Also, the mating concave-convex edges narrow the gap between adjacent tiles 21, which provide better thermal coverage over the whole circumference of the seam.

Figure 8:
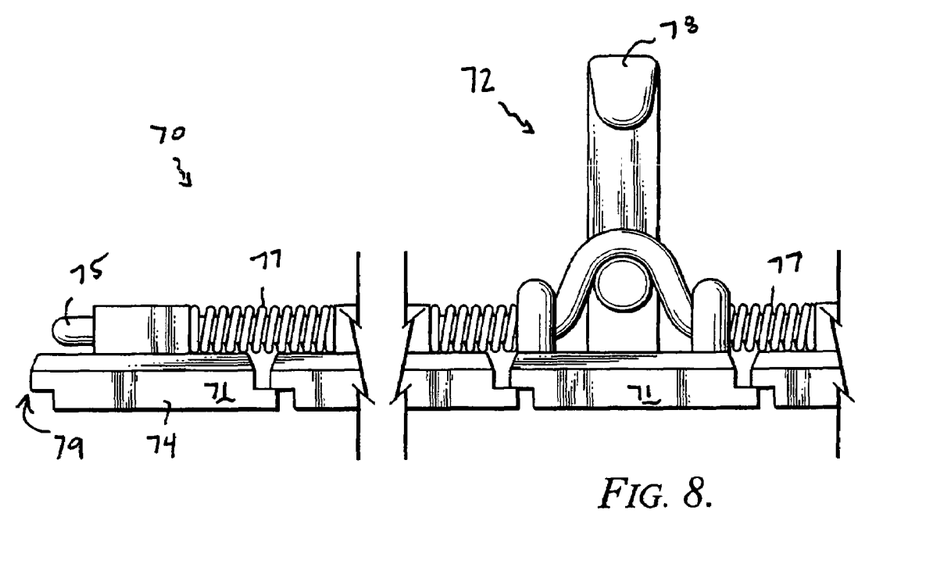
FIG. 8 is an elevational view of an active length of tile units in accordance with the invention for constructing an alternate embodiment of an internal ring backup assembly in accordance with the invention, wherein some portions are broken away to foreshorten the section and others are removed from view.
Figure 9:
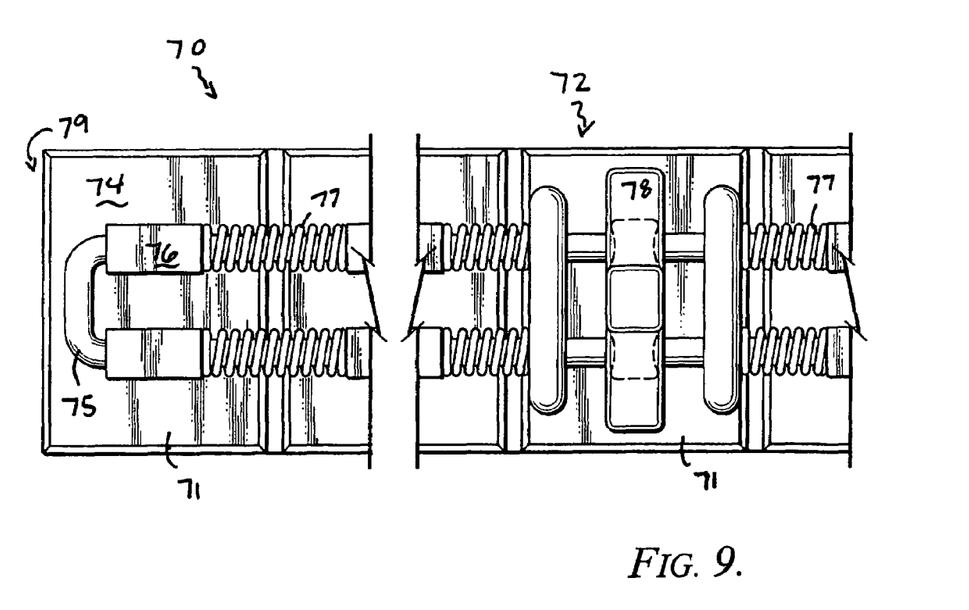
FIG. 9 is a top plan view thereof.

FIGS. 8 and 9 show an alternative strategy for achieving the application of the jamming or wedging force preferred for the invention. That is, FIGS. 8 and 9 show an "active" length 70 of tile units in accordance with the invention for constructing an alternate embodiment of an internal ring backup assembly in accordance with the invention (compare, eg., internal ring backup assembly 270 in FIG. 13). To turn briefly to FIG. 13, it shows an internal ring backup assembly 270 comprised of an active length 70 and, in contrast, a "passive" length 200. The "passive" length 200 forms the greater fraction of the overall length of the internal ring 270's circumference. In contrast, the "active" length 70 forms only a minor fraction thereof. The "active" length 70 functions like a coil compression spring, which acts against the two ends of the "passive" length 200. The "passive" length 200, as is true with chains of tile units 20, has practically no compressibility. Hence whatever compressive force is applied to the ring 270 as a whole by the "active" length 70 is of course carried and held by the "passive" length 200 as well.

To turn back to FIGS. 8 and 9, the active length 70 is serviced by an optional embodiment of a jamming or wedging force applicator 72 in accordance with the invention. The active length 70 is produced from a series of tile units 74 the bottom out in tiles 71. Tiles 71, as well as tiles 21, are preferably produced of a high conductivity metal, such as copper, and more preferably of high-conductivity oxygen-free copper. The remainder of the construction materials may comprise any various materials including steel, aluminum, stainless steel, spring steel (ie., for springs), steel cable and so on.

In the active length 70, the tiles 71 are held together by a tether. In FIGS. 8 and 9, one embodiment of a tether includes for example and without limitation a looped steel cable 75. The cable 75 passes relatively freely through apertured mounting blocks 76, and adjacent tile units 74 are biased apart by compression springs 77. A T-headed actuator 78 operates to allow a worker to manually acuate the actuator 72 (which is in the "up" direction in FIG. 8) to shorten the length of the active length 70. That way, a worker can insert the foreshortened active length 70 between the ends of a passive length (eg., 200 in FIG. 13). Once inserted, the worker can relax his or her squeeze on the actuator 72 and thereby obtain an expansion force on the chain assembly 270 as whole. The expansion force naturally forces the tiles 71 and 220 against an inside wall of a hoop section (see FIG. 13).

Figure 10:
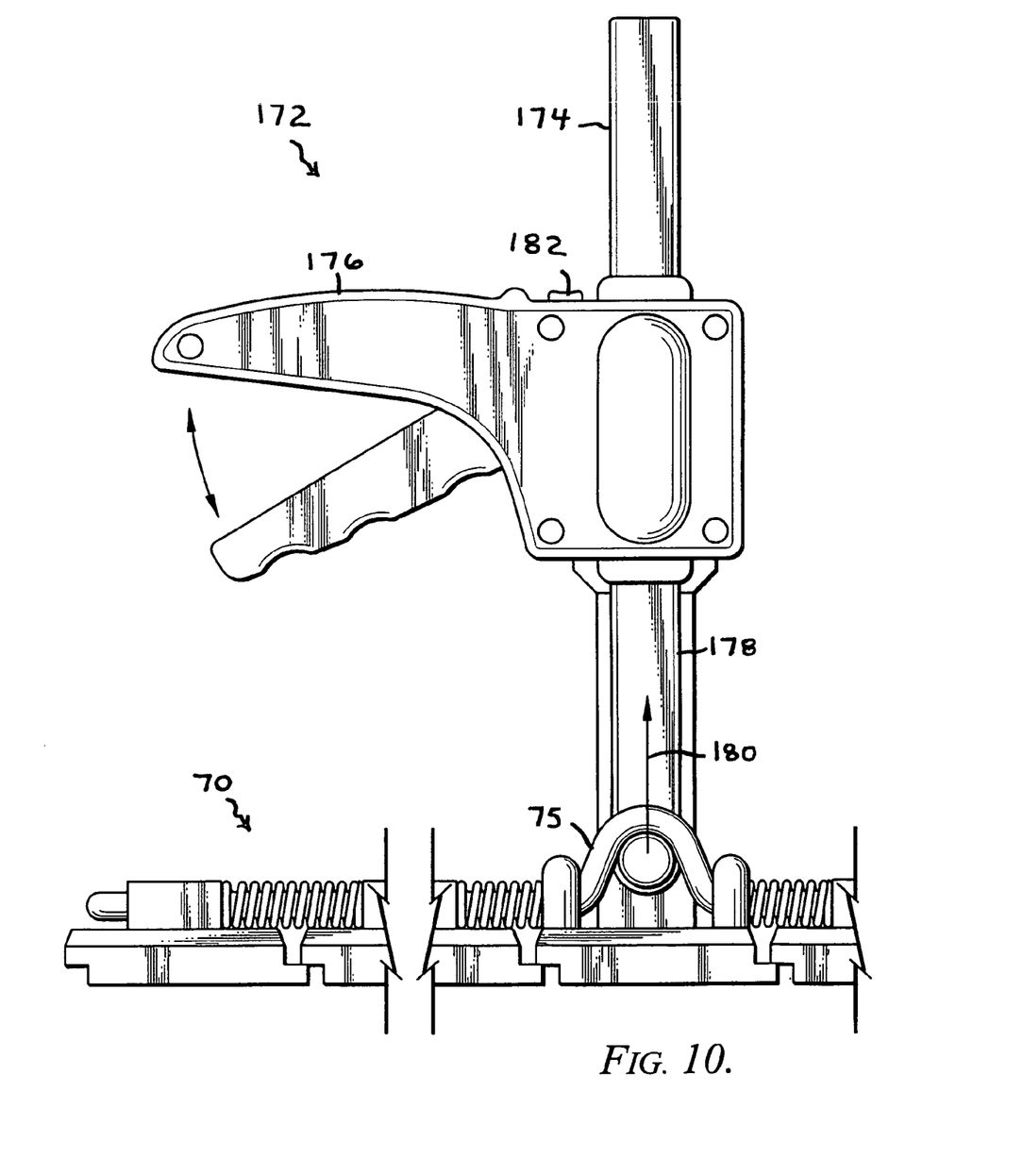
FIG. 10 is an elevational view of an alternative embodiment of an actuator for the FIGS. 8 and 9 embodiment, and which actuator provides a user with a mechanical advantage for foreshortening the active length of tiles therein.

FIG. 10 shows an alternative embodiment of an actuator 172 for the FIGS. 8 and 9 embodiment of an active length 70 of tile units. This actuator 172 provides a user with a mechanical advantage for foreshortening the active length 70. The actuator 172 comprises a standard 174, a trigger-actuated traveler 176, and a pair of pull rods 178 (near side only in view) secured to the traveler 176 and flanking the standard 174. Each pull rod 178 terminates in a lugged-end formed with lugs over which the centers of the cables 75 are looped. A user operates this actuator 172 as follows. Squeezing the trigger of the trigger-actuated traveler 176 causes a mechanism (not shown) inside the traveler 176 comprising a ratchet and drive gear (again, not shown) to drive the traveler 176 up the standard 174 (eg., "up" given the orientation of FIG. 10). The effect this has on the pull rods 178 is to exert a pulling force on the cables 75, causing the cable centers to pull out as indicated by direction arrow 180, which in consequence foreshortens the active length 70.

The traveler 176's internal ratchet mechanism locks the travel of the traveler 176 on the standard 174 after each squeeze of the trigger. The user can therefore squeeze the trigger several times in a row and successively tighten the foreshortening of the active length 70 until all the slack is squeezed out between adjacent tiles 71. Since the ratchet locks the foreshortening of the active length 70 after each squeeze of the trigger of actuator 172, the active length 70 remains compressed in its compact-most state until the ratchet is let off. That way, a user can leisurely squeeze down the active length 70 in one place and then carry it over to another place where it inserts between the ends of a passive length 200. The worker can therefore do the following. The worker might squeeze out the slack in the active length 70 by doing so with the tiles 71 laying flat on the floor. Then, with the active length 70 locked down by the traveler 174, the user lifts the active length 70 up off the floor and places it in its use position against the tank T's wall. The locked down active length 70 is released from being locked down by the ratchet, and spread apart, by the user releasing the traveler 176 on the standard 174 as including by a release button 182.

Figure 11:
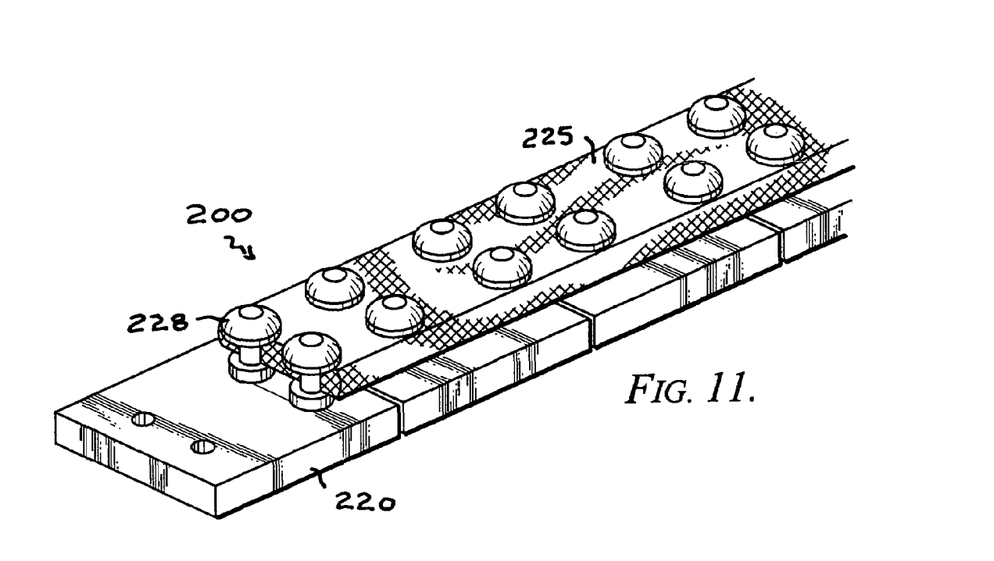
FIG. 11 is a perspective view of a further embodiment of linked together tiles in accordance with the invention.
Figure 12:
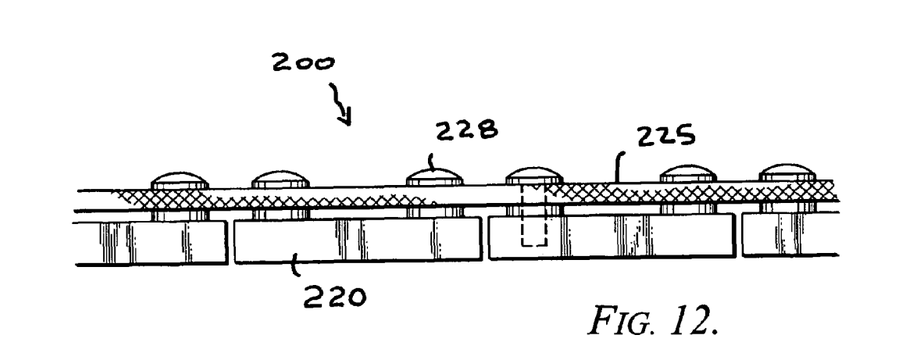
FIG. 12 is an elevational view of the embodiment of FIG. 11.

FIGS. 11 and 12 show better the "passive" length 200 of linked together tiles 220 in accordance with the invention. The passive length 200 comprises tiles 220 linked together by a flexible band 250 of woven copper filaments. The band 250 is indeed flexible but little else. It affords only minimal stretch or foreshortening, and is considered not resilient for application of a compressive force. The band 250 fairly much has a fixed length, plus or minus a small fractional percentage of stretch or compaction due to the weave. Each tile 220 is shown allowing up to four (4) rivet connections 228 to the overlying flexible band 250. The overall length 200 of tiles 220 linked together this way is termed a "passive" length for convenience sake in this description, but also in recognition that, in contrast to an "active" length 70, each tile 220 is situated fairly tightly-abutted next to its neighbors. Consequently, passive lengths 200 do not contribute to the jamming or wedging action as does a compressively-biased active length 70. Additionally, the "overall length" of a passive length 200 might be produced as an assembly of sub-assemblies, each sub-assembly comprising a dozen or dozens of discrete tiles 220 or so.

Figure 13:
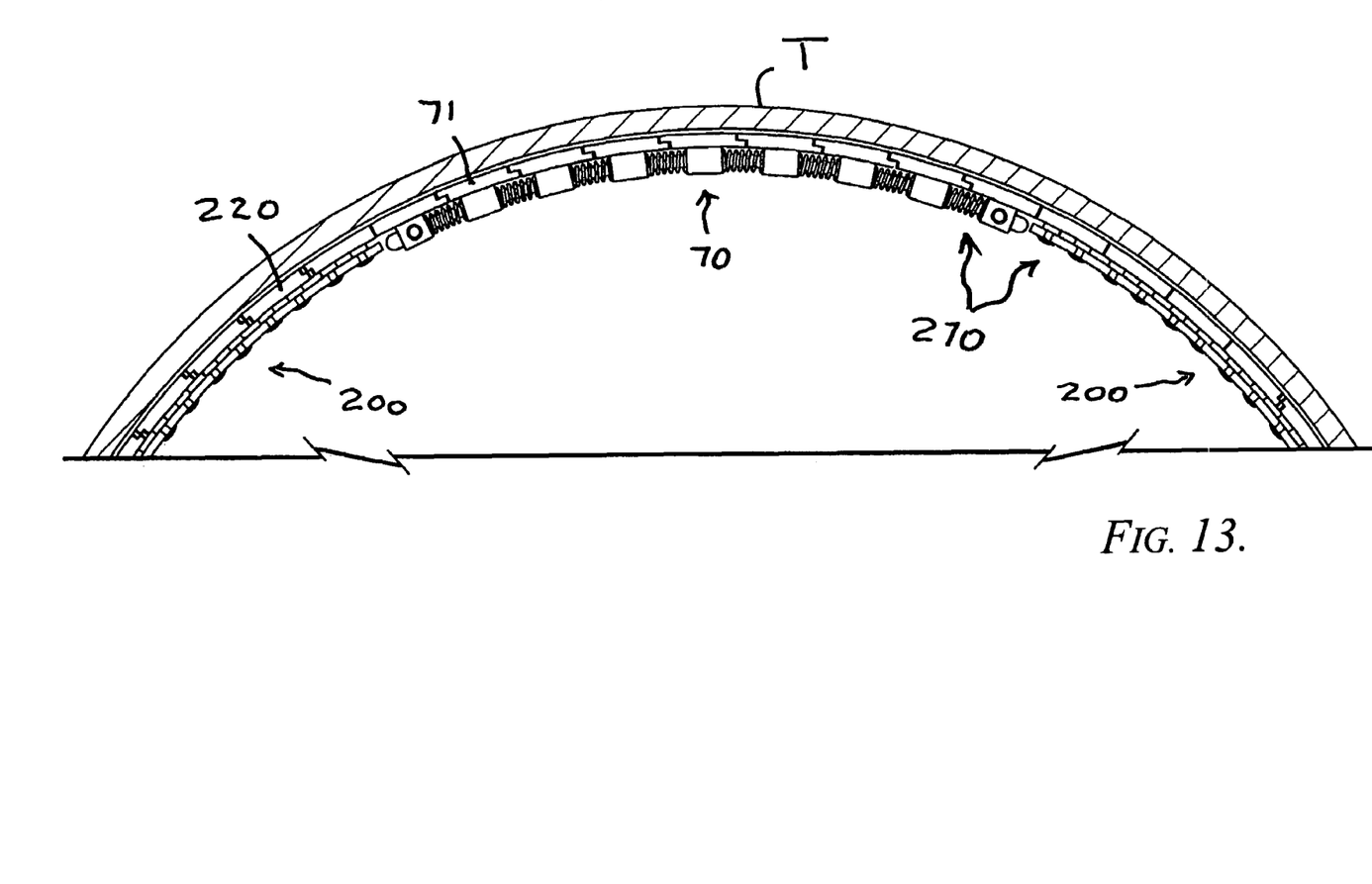
FIG. 13 is a reduced scale top plan view, the tank wall being shown in section, showing an example operative use environment for the linked together tile units in accordance with the embodiment of FIGS. 11 and 12 in combination with an active length of tile units comparable to the embodiment of FIGS. 8 and 9, partly broken away.

FIG. 13 shows the passive length 200 deployed in combination with the active length 70 in order to obtain internal ring assembly 270 for welding backup. The passive length 200 forms the greater fraction of the overall length of the internal ring assembly 270's circumference. In contrast, the active length 70 is only a minor fraction thereof. During set-up, a worker would tape up the passive length 200 in place separately. What that accomplishes is the passive length 200 being temporarily stabilized in place over the seam except for a gap of twelve to twenty inches or so (~30 to 50 cm). The gap is naturally defined between the opposite ends of the passive length 200. It is this gap which is to be filled by the active length 70.

The factors which determine the selected "length" of the active length 70 includes the following. One factor is the linear measure of the active length 70 in its relaxed state, ie., whether it measures considerably longer than the gap it has to fill. Another factor is contrasting factor. That is, the linear measure of the active length 70 in its compact-most state because of course it has to insert within the gap. That way, when the compression is released, the active length 70 spreads apart and forcibly provides the wedging or jamming action for the overall internal ring 270. When this is done, all the tiles 71 and 220 alike are forced into good thermal contact with the tank T's inside wall.

Figure 14:
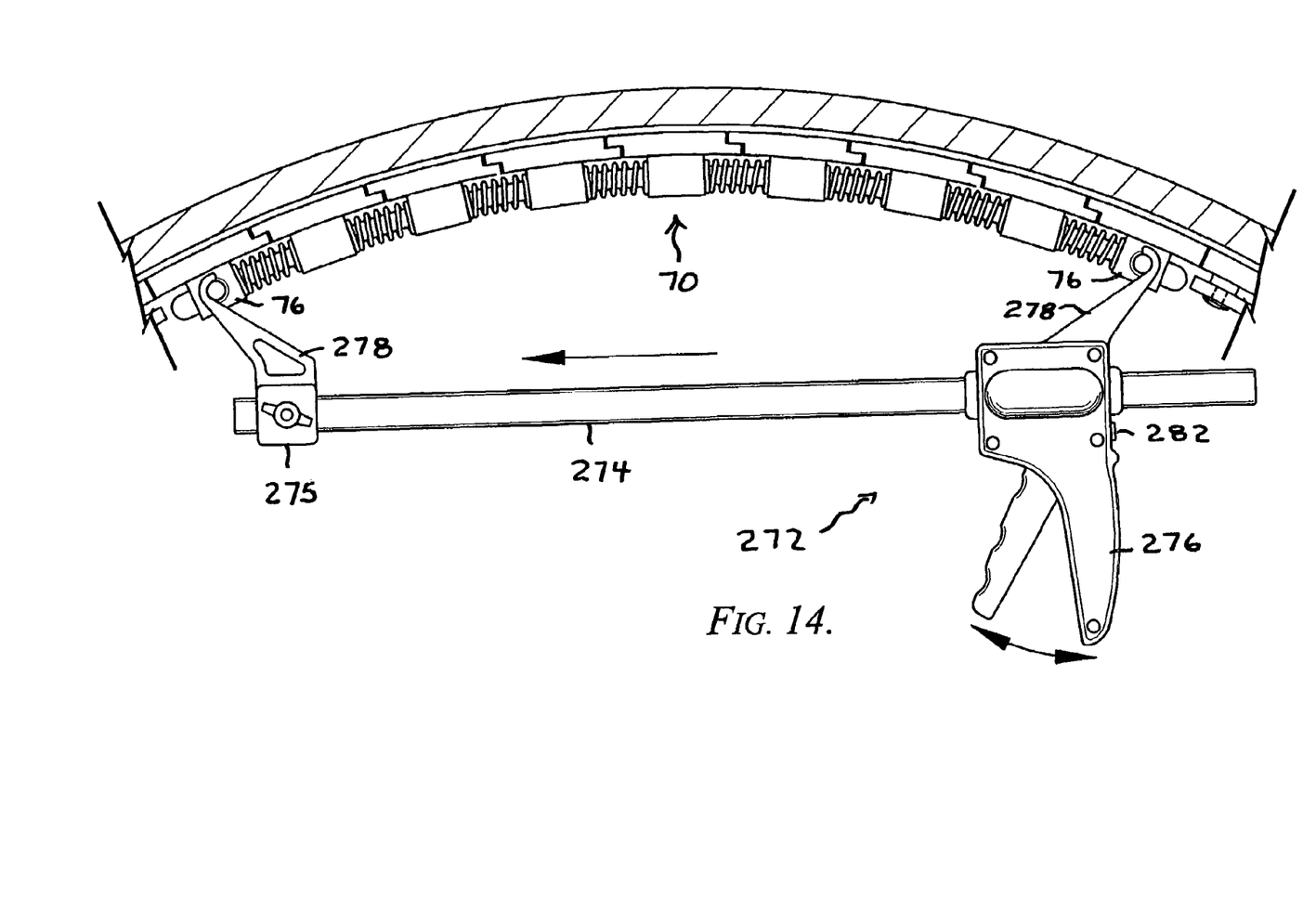
FIG. 14 is an enlarged scale top plan view comparable to FIG. 13 except showing a further embodiment of an actuator in accordance with invention for foreshortening the active length of tile units.

FIG. 14 shows a further embodiment of an actuator 272 in accordance with invention for foreshortening an active length 70 of tile units 71. This actuator 272 comprises a bar 274 carrying a stationary bracket 275 on one end. The stationary bracket 275 has a pair of hooks 278 for hooking on the lugs of an end mounting block 76. The bar 274 further carries a trigger-actuated traveler 276 which also has a pair of hooks 278 for hooking on the lugs of the opposite end's mounting block 76.

A user operates this actuator 272 as follows. Squeezing the trigger of the trigger-actuated traveler 276 causes a mechanism (not shown) inside the traveler 276 comprising a ratchet and drive gear (not shown) to drive the traveler 276 inwards on the bar 274 (eg., "left" given the orientation of FIG. 10). The effect this has on active length 70 is to foreshorten it. As described more particularly above, the user can shorten the active length 70 in a series of squeezes because of the locking action of the ratchet, and do so on the floor until ready to place in the gap. Once inserted in the gap, the foreshortened active length 70 is allowed to spread apart again by the user releasing the traveler 276 on the bar 274 as including by the release button 282.

Figure 15:
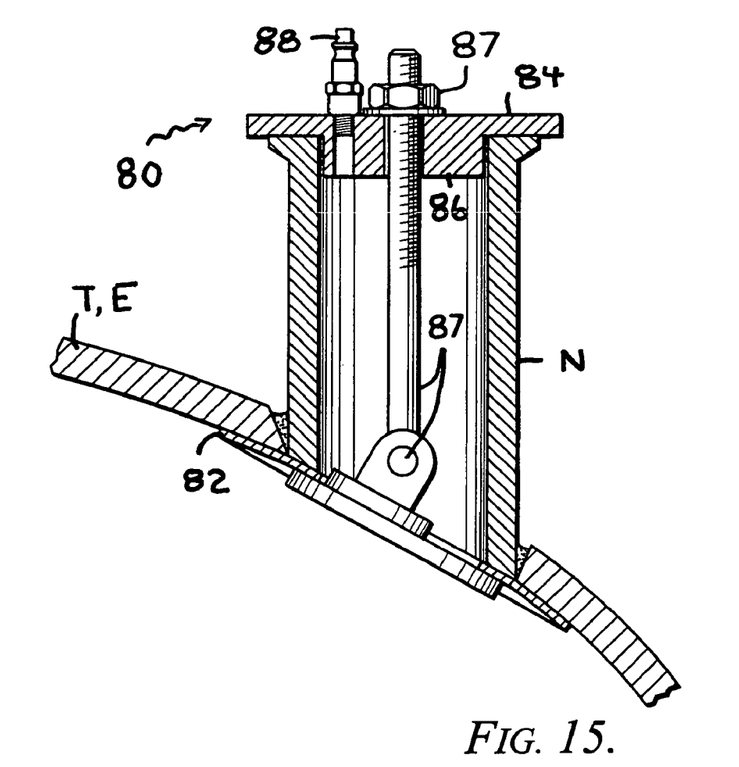
FIG. 15 is an enlarged scale section view taken along line XV-XV in FIG. 1, except including illustration of an additional embodiment in accordance with the invention for welding backup, as more particularly for the weldment joining a nozzle to the domed cap of the tank.

FIG. 15 shows a welding backup arrangement 80 in accordance with the invention for the weldment that joins a nozzle N to the domed cap E of the tank T. This welding backup arrangement 80 comprises an annulus backup plate 82, a stemmed lid 84 that includes a stem portion 86, an actuator 87, and a purge fitting 88 for supply of a purge gas. It is an aspect of the invention that the welding backup arrangement 80 operates to clamp annulus backup plate 82 by virtue of the lid 84 and actuator 87 opposite the weld seam for at least purge purposes, and perhaps light-duty heat-sink purposes. The lid 84 operates not only as a heat sink but the stem portion 86 is sized for closely fitting inside the top end of the nozzle N and thereby assist in maintaining the roundness of the nozzle N's top end during the welding operation. That way, this helps prevent the nozzle N's top end from distorting into an ovoid shape or the like.

Figure 16:
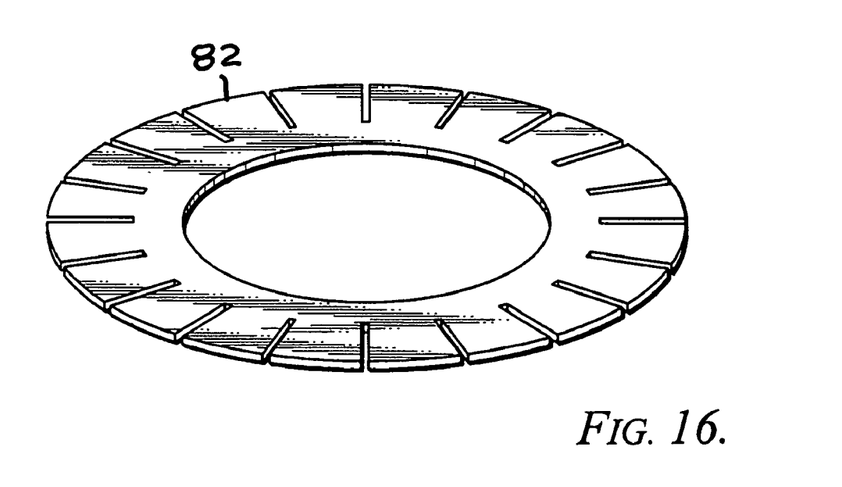
FIG. 16 is an enlarged scale perspective view of the annulus backup plate in FIG. 15.

As FIG. 16 shows better, preferably the annulus backup plate 82 is slotted as shown to allow flexure and conformance to complexly-warped geometries of a domed structure. Preferably the annulus backup plate 82 is produced of a high conductivity metal such as copper, and more preferably of high-conductivity, oxygen-free copper.

Figure 17:
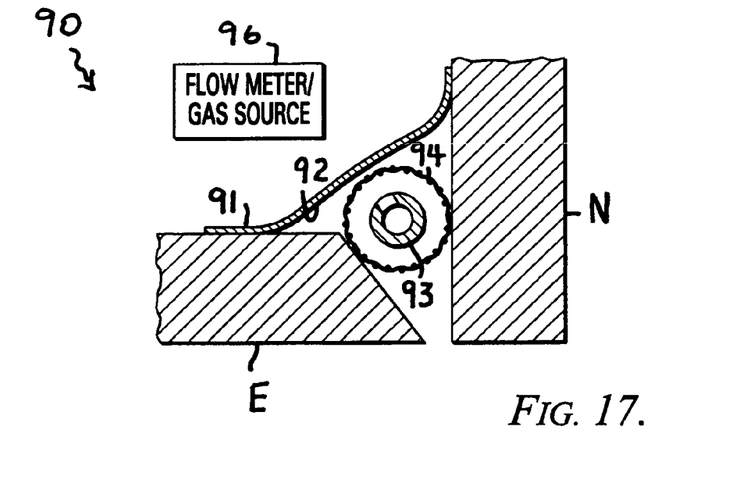
FIG. 17 is an enlarged scale section view showing another embodiment in accordance with the invention for welding backup, as more particularly showing a purge arrangement for creases.
Figure 18:
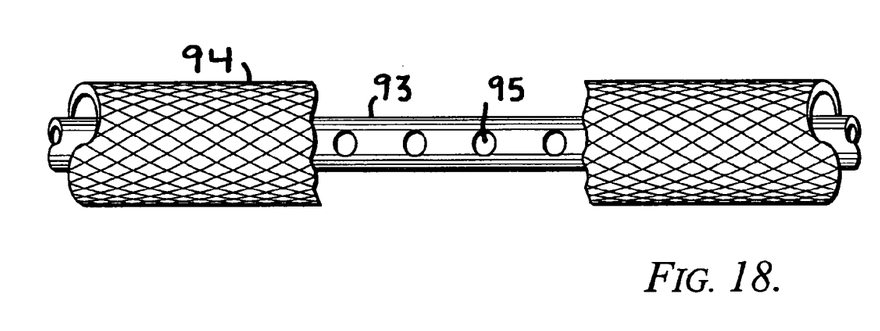
FIG. 18 is an enlarged scaled elevational view of the ventilated tube and its sheath in FIG. 17.

FIGS. 17 and 18 show another embodiment in accordance with the invention, as for more particularly achieving a purge arrangement 90 for both creases (as shown) and cylindrical seams (not shown) or the like. In FIG. 17, this crease may be typical of—and only as an example and without limitation—being formed between a nozzle N and end cap E. The crease can be serviced by purge arrangement 90 which comprises a seal of metallic tape 91 (aluminum is suitable) having an adhesive layer 92 for sealing in a ventilated tube 93 and its porous sheath 94. Preferably the ventilated tube 93 is formed of copper as well, and is perforated regularly with vents 95. Preferably the sheath comprises a woven copper-filament flexible conduit. In use, the ventilated tube 93 is preferably serviced by a metered gas source 96.

This purge arrangement 90 can be comparable adapted for other uses than besides with creases alone. That is, purge arrangement 90 can be satisfactorily strung around an inside diameter or an outside diameter to provide purge service welding a seam from the opposite side of the tank wall as the purge arrangement 90.

Figures 19, 20, 21:
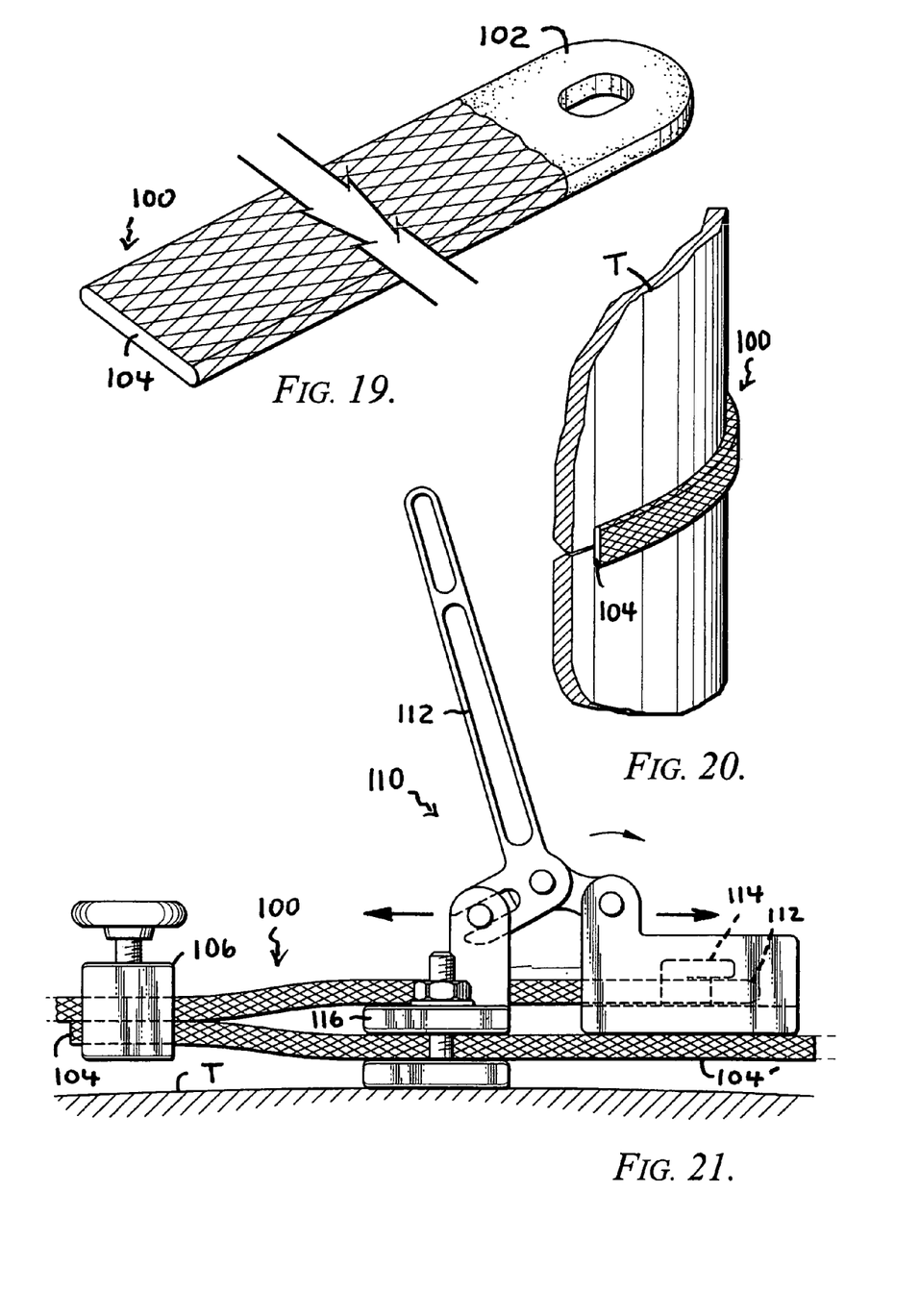
FIG. 19 is a perspective view of the spaced end portions of a belt for pipe welding backup in accordance with the invention, wherein middle portions are broken away to foreshorten the illustration.
FIG. 20 is a reduced scale perspective view showing one end of the belt of FIG. 19 lapped externally over the outboard course of a hoop seam for the tank of FIG. 1.
FIG. 21 is an enlarged scale sectional view of the tank, with portions broken away, including illustration of portions of the belt FIGS. 19 and 20, as well as a clamp and come-along device in accordance with the invention for cinching tight and clamping the belt in a use position.

FIG. 19 shows at least the spaced end portions of a belt 100 for pipe welding backup in accordance with the invention, as for lapping externally over the outboard course of a hoop seam for the tank T (see, eg, FIG. 20). Preferably the belt 100 of FIGS. 19 through 21 comprises a copper braided construction. One end 102 is formed as a mated, hard-metal loop end such as of brass, bronze, beryllium or like metals amenable to a brazing, soldering or fusion mating. The terminating end 104 can be simply a cut-off end as shown in either of FIG. 19 or 20.

FIG. 21 shows a minor section of the tank T with the belt 100 girdling it in order to better show a clamp 106 and come-along device 110 in accordance with the invention. The come-along device 110 has a lever actuator 112 which when actuated in the clockwise direction (as reckoned by FIG. 21) causes its pin connection 114 with the belt 100's loop end 102 to be forced apart from a clamped connection 116 with a marginal end-portion 104' of the belt 100's blank end 104. To fully tighten the belt 100, operation of the lever actuator 112 preferably takes several strokes. Preparatory to each spreading stroke, the come-along 110's clamp 114 is tightened and the belt 100's clamp 106 is relaxed. A stroke of the come-along 110 cinches the belt 100 incrementally, which slips through the belt 100's relaxed clamp 106, which at the end of the stroke is tightened. The come-along 110's clamp 114 is released, manually slid along the belt 100 in the direction of the loop end 102, during while the lever 112 is being pivoted fully counterclockwise, then clamp 114 is re-tightened. Belt-clamp 106 is next relaxed so that a successive stroke of the lever 112 further tightens the girdle force of the belt on the tank T. Once the desired girdle compression for belt 100 is achieved, the come-along device 110 may be removed and a worker is then preferably afforded an inventive opportunity to weld and inside weldment to the seam of the tank T with the heat-sink service of cinched-tight belt 100 on the outboard side of the seam.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. Compression belting for backing an endless course of a butt-weld seam between pipe or tank sections from inside a hollow core as a welding backup provision during welding on the outside thereof, comprising:

one or more belt sub-assemblies of which at least one is a major belt sub-assembly for backing a majority of the seam's course, said major belt-subassembly comprising:

a plurality of tiles, each having a seam-covering surface spaced by four edges from a utility surface, the four edges comprising a pair of anterior edges spaced by a pair of lateral edges, wherein the tiles are arranged in a procession between one end tile and another end tile with anterior edges between adjacent tiles situated in close or abutting positions, and an inter-tile linking system linking all the tiles flexibly so that the major belt sub-assembly is capable of backing at least a majority of the seam's course from inside the hollow core as with the utility surfaces facing the hollow core and the seam-backing surfaces lapping across the seam over onto margins of inside walls of the pipe or tank sections; and an expansion-force application system inserted between the one and another end tiles for applying an expansion force on said end tiles and thereby squeezing out the slack between adjacent tiles to achieve self-holding capability as well as promoting close proximity or contact between the tiles' seam-covering surfaces and the overlapped margins of the inside walls of the pipe or tank sections.

2. The compression belting of claim 1 wherein the major belt sub-assembly disassembles into discrete units comprising a single tile or discrete units comprising more than one tile.

3. The compression belting of claim 1 wherein each tile's anterior surfaces are oppositely respectively convex and concave relative to each other.

4. The compression belting of claim 1 wherein each tile's anterior surfaces are oppositely stepped relative to each other.

5. The compression belting of claim 1 wherein the inter-tile linking system comprises a cell of a roller chain attached to the utility surface of each tile, and pinned together with counterpart cells on adjacent tiles.

6. The compression belting of claim 1 wherein the inter-tile linking system comprises a flexible band coursing an inside circuit over the utility surfaces of the tiles, and couplers securing a band to each tile at spaced positions.

7. The compression belting of claim 6 wherein the tiles, couplers and band are all metallic.

8. The compression belting of claim 7 wherein the band comprises a woven matrix of metal filaments.

9. The compression belting of claim 1 wherein the expansion-force application system comprises a biasing belt sub-assembly, which is another of the one or more belt sub-assemblies, said biasing belt sub-assembly comprising:

a plurality of tiles having a seam-covering surface spaced from a utility surface by a spaced pair of anterior edges as well as a spaced pair of lateral edges and arranged in a procession between one terminal tile and another terminal tile with anterior edges between adjacent tiles situated in close or abutting positions, and an inter-tile biasing system coupling the biasing belt sub-assembly's procession of tiles in a biasing relationship so that the biasing belt sub-assembly is capable of being externally foreshortened in order to be pre-loaded with a potential expansion force and being thereafter released between the end tiles of the major belt sub-assembly for applying said expansion force therebetween.

10. The compression belting of claim 9 wherein inter-tile biasing system comprises an apertured block attached to the utility surface of each tile of the biasing belt sub-assembly, a compression spring between each block of adjacent tiles, and a tether extending through every apertured block between the terminal tiles.

11. The compression belting of claim 10 wherein the tether comprises cabling that can be pulled to foreshorten the biasing belt sub-assembly in order to obtain the pre-loading thereof with a potential expansion force.

12. The compression belting of claim 11 wherein further comprising a manual actuator allowing a user to manually foreshorten the biasing belt sub-assembly in order to obtain the pre-loading thereof with a potential expansion force.

13. The compression belting of claim 1 wherein the expansion-force application system comprises a series of at least two tiles pivoted to each other to toggle in tightly between the end tiles of the major belt sub-assembly and thereby achieve the expansion or jamming effect.

* * * * *